(12) United States Patent
Bansal et al.

(10) Patent No.: US 12,125,012 B2
(45) Date of Patent: Oct. 22, 2024

(54) METHOD, SYSTEM, AND COMPUTER PROGRAM PRODUCT FOR TRANSLATING MESSAGES

(71) Applicant: Visa International Service Association, San Francisco, CA (US)

(72) Inventors: Naman Bansal, Bellevue, WA (US); Pankaj Taneja, Lynnwood, WA (US)

(73) Assignee: Visa International Service Association, San Francisco, CA (US)

( * ) Notice: Subject to any disclaimer, the term of this patent is extended or adjusted under 35 U.S.C. 154(b) by 38 days.

(21) Appl. No.: 17/991,516

(22) Filed: Nov. 21, 2022

(65) Prior Publication Data

US 2023/0088119 A1    Mar. 23, 2023

Related U.S. Application Data

(63) Continuation of application No. 16/778,533, filed on Jan. 31, 2020, now Pat. No. 11,544,689.

(51) Int. Cl.

| | |
|---|---|
| G06Q 30/00 | (2023.01) |
| G06Q 20/02 | (2012.01) |
| G06Q 20/20 | (2012.01) |
| G06Q 40/02 | (2023.01) |
| H04L 69/325 | (2022.01) |

(52) U.S. Cl.
CPC ......... *G06Q 20/202* (2013.01); *G06Q 20/027* (2013.01); *G06Q 20/204* (2013.01); *G06Q 40/02* (2013.01); *H04L 69/325* (2013.01)

(58) Field of Classification Search
CPC ..... G06Q 20/202; G06Q 20/027; G06Q 40/02
See application file for complete search history.

(56) References Cited

U.S. PATENT DOCUMENTS

| | | | |
|---|---|---|---|
| 5,239,662 A | 8/1993 | Danielson et al. | |
| 5,694,580 A | 12/1997 | Narita et al. | |
| 5,845,283 A | 12/1998 | Williams et al. | |
| 7,167,924 B1 | 1/2007 | Symonds et al. | |
| 2012/0150687 A1* | 6/2012 | Hart | G06Q 30/0613 705/26.41 |
| 2014/0089120 A1* | 3/2014 | Desai | G06Q 20/322 705/39 |
| 2018/0268387 A1* | 9/2018 | Bradley | G06Q 20/322 |
| 2020/0193405 A1* | 6/2020 | Bedier | G06Q 20/40975 |

* cited by examiner

*Primary Examiner* — Rokib Masud
(74) *Attorney, Agent, or Firm* — The Webb Law Firm

(57) ABSTRACT

A computer-implemented method includes: installing a first message protocol on a transaction terminal based on a provider thereof; installing an adapter layer on the terminal, the adapter layer including a mapping from the first message protocol to a standard message protocol; reading payment data from a payment device, the payment data associated with a transaction; generating a message including the payment data according to the first message protocol; translating the message from the first message protocol to the standard message protocol with the adapter layer to form a transaction message; and communicating the transaction message to a transaction processing system.

18 Claims, 6 Drawing Sheets

METHOD, SYSTEM, AND COMPUTER PROGRAM PRODUCT FOR TRANSLATING MESSAGES

CROSS-REFERENCE TO RELATED APPLICATION

This application is a continuation application of U.S. patent application Ser. No. 16/778,533, filed Jan. 31, 2020, the disclosure of which is hereby incorporated by reference in its entirety.

BACKGROUND

1. Technical Field

The disclosure relates to translating messages and, in some non-limiting embodiments or aspects, to a method, system, and computer program product for translating a message from a first message protocol to a standard message protocol at a transaction terminal.

2. Technical Considerations

In today's market, there are many options for transaction terminal providers who provide transaction terminals to merchants for initiating electronic payment transactions with their customers. Each transaction terminal generates a transaction message (e.g., for communicating to a payment gateway system, an acquirer system, and/or a transaction processing system) to cause the electronic payment transaction to be processed (e.g., authorized, cleared, and/or settled).

However, depending on the transaction terminal provider, the transaction messages, including the transaction data and/or other fields contained therein, may be formatted according to a message protocol that is specific to the provider, and that message protocol may include arranging and/or formatting the transaction messages (e.g., fields thereof) differently. As such, in order to process the transaction messages from the various transaction terminal providers, the receiver of such messages (e.g., payment gateway system, acquirer system, and/or transaction processing system) is required to process various different transaction messages formatted according to various different provider-specific message protocols, each of which may include differently arranged and/or formatted transaction messages. This adds significant processing complexities for the receiver (e.g., payment gateway system, acquirer system, and/or transaction processing system).

SUMMARY

Accordingly, and generally, provided is an improved method, system, and computer program product for translating messages.

According to some non-limiting embodiments or aspects, a computer-implemented method includes: installing, with at least one processor, a first message protocol from a plurality of message protocols on a first transaction terminal based on a first provider of the first transaction terminal; installing, with at least one processor, an adapter layer on the first transaction terminal, where the adapter layer includes a mapping from at least one of the plurality of message protocols to a standard message protocol, where the at least one of the plurality of message protocols includes the first message protocol; reading, with at least one processor, first payment data from a first payment device, the first payment data associated with a first transaction; generating, with at least one processor, a first message including the first payment data according to the first message protocol; translating, with at least one processor, the first message from the first message protocol to the standard message protocol with the adapter layer to form a first transaction message including the first payment data associated with the first transaction; and communicating, with at least one processor, the first transaction message to a transaction processing system.

In some non-limiting embodiments or aspects, the method further includes: installing, with at least one processor, a second message protocol from the plurality of message protocols on a second transaction terminal based on a second provider of the second transaction terminal, where the second message protocol may be different from the first message protocol; installing, with at least one processor, the adapter layer on the second transaction terminal, where the at least one of the plurality of message protocols may include the second message protocol; reading, with at least one processor, second payment data from a second payment device, the second payment data associated with a second transaction; generating, with at least one processor, a second message including the second payment data using the second message protocol; translating, with at least one processor, the second message from the second message protocol to the standard message protocol with the adapter layer to form a second transaction message including the second payment data associated with the second transaction; and communicating, with at least one processor, the second transaction message to the transaction processing system.

In some non-limiting embodiments or aspects, installing the first message protocol may include installing at least two of the plurality of message protocols on the first transaction terminal, where the at least two message protocols may include the first message protocol and a second message protocol, where the method may further include: in response to reading the first payment data from the first payment device, determining, with at least one processor, the first provider of the first transaction terminal; and selecting, with at least one processor, the first message protocol from the at least two message protocols based on the first provider of the first transaction terminal, where the first message may be generated in response to selecting the first message protocol.

In some non-limiting embodiments or aspects, only one provider-specific message protocol may be installed on the first transaction terminal, where the one provider-specific message protocol may include the first message protocol. The adapter layer may include only one mapping from the one provider-specific message protocol to the standard message protocol.

In some non-limiting embodiments or aspects, the first transaction terminal may include a point-of-sale (POS) device including at least one of a chip payment device reader, a magnetic stripe payment device reader, a contactless payment device reader, or any combination thereof. The standard message protocol may specify a predetermined message format associated with at least one of the transaction processing system, an issuer system, a gateway system, an acquirer system, or any combination thereof. The standard message protocol may be specified by an international banking standard.

According to some non-limiting embodiments or aspects, a system for processing an electronic payment transaction includes at least one processor programmed or configured to: install a first message protocol from a plurality of message protocols on a first transaction terminal based on a first provider of the first transaction terminal; install an adapter layer on the first transaction terminal, where the adapter layer includes a mapping from at least one of the plurality of message protocols to a standard message protocol, where the at least one of the plurality of message protocols includes the first message protocol; read first payment data from a first payment device, the first payment data associated with a first transaction; generate a first message including the first payment data according to the first message protocol; translate the first message from the first message protocol to the standard message protocol with the adapter layer to form a first transaction message including the first payment data associated with the first transaction; and communicate the first transaction message to a transaction processing system.

In some non-limiting embodiments or aspects, the processor may be programmed or configured to: install a second message protocol from the plurality of message protocols on a second transaction terminal based on a second provider of the second transaction terminal, where the second message protocol may be different from the first message protocol; install the adapter layer on the second transaction terminal, where the at least one of the plurality of message protocols may include the second message protocol; read second payment data from a second payment device, the second payment data associated with a second transaction; generate a second message including the second payment data using the second message protocol; translate the second message from the second message protocol to the standard message protocol with the adapter layer to form a second transaction message including the second payment data associated with the second transaction; and communicate the second transaction message to the transaction processing system.

In some non-limiting embodiments or aspects, installing the first message protocol may include installing at least two of the plurality of message protocols on the first transaction terminal, where the at least two message protocols may include the first message protocol and a second message protocol, where the processor may be programmed or configured to: in response to reading the first payment data from the first payment device, determine the first provider of the first transaction terminal; and select the first message protocol from the at least two message protocols based on the first provider of the first transaction terminal, where the first message may be generated in response to selecting the first message protocol.

In some non-limiting embodiments or aspects, only one provider-specific message protocol may be installed on the first transaction terminal, where the one provider-specific message protocol may include the first message protocol. The adapter layer may include only one mapping from the one provider-specific message protocol to the standard message protocol.

In some non-limiting embodiments or aspects, the first transaction terminal may include a point-of-sale (POS) device including at least one of a chip payment device reader, a magnetic stripe payment device reader, a contactless payment device reader, or any combination thereof. The standard message protocol may specify a predetermined message format associated with at least one of the transaction processing system, an issuer system, a gateway system, an acquirer system, or any combination thereof. The standard message protocol may be specified by an international banking standard.

According to some non-limiting embodiments or aspects, a computer program product for processing an electronic payment transaction includes at least one non-transitory computer-readable medium including one or more instructions that, when executed by at least one processor, cause the at least one processor to: install a first message protocol from a plurality of message protocols on a first transaction terminal based on a first provider of the first transaction terminal; install an adapter layer on the first transaction terminal, where the adapter layer includes a mapping from at least one of the plurality of message protocols to a standard message protocol, where the at least one of the plurality of message protocols includes the first message protocol; read first payment data from a first payment device, the first payment data associated with a first transaction; generate a first message including the first payment data according to the first message protocol; translate the first message from the first message protocol to the standard message protocol with the adapter layer to form a first transaction message including the first payment data associated with the first transaction; and communicate the first transaction message to a transaction processing system.

In some non-limiting embodiments or aspects, the one or more instructions may cause the at least one processor to: install a second message protocol from the plurality of message protocols on a second transaction terminal based on a second provider of the second transaction terminal, where the second message protocol may be different from the first message protocol; install the adapter layer on the second transaction terminal, where the at least one of the plurality of message protocols may include the second message protocol; read second payment data from a second payment device, the second payment data associated with a second transaction; generate a second message including the second payment data using the second message protocol; translate the second message from the second message protocol to the standard message protocol with the adapter layer to form a second transaction message including the second payment data associated with the second transaction; and communicate the second transaction message to the transaction processing system.

In some non-limiting embodiments or aspects, installing the first message protocol may include installing at least two of the plurality of message protocols on the first transaction terminal, where the at least two message protocols include the first message protocol and a second message protocol, where the one or more instructions cause the at least one processor to: in response to reading the first payment data from the first payment device, determine the first provider of the first transaction terminal; and select the first message protocol from the at least two message protocols based on the first provider of the first transaction terminal, where the first message may be generated in response to selecting the first message protocol.

In some non-limiting embodiments or aspects, only one provider-specific message protocol may be installed on the first transaction terminal, where the one provider-specific message protocol may include the first message protocol. The adapter layer may include only one mapping from the one provider-specific message protocol to the standard message protocol.

In some non-limiting embodiments or aspects, the first transaction terminal may include a point-of-sale (POS) device including at least one of a chip payment device reader, a magnetic stripe payment device reader, a contactless payment device reader, or any combination thereof. The standard message protocol may specify a predetermined message format associated with at least one of the transaction processing system, an issuer system, a gateway system, an acquirer system, or any combination thereof. The standard message protocol may be specified by an international banking standard.

Further non-limiting embodiments or aspects are set forth in the following numbered clauses:

Clause 1: A computer-implemented method, comprising: installing, with at least one processor, a first message protocol from a plurality of message protocols on a first transaction terminal based on a first provider of the first transaction terminal; installing, with at least one processor, an adapter layer on the first transaction terminal, wherein the adapter layer comprises a mapping from at least one of the plurality of message protocols to a standard message protocol, wherein the at least one of the plurality of message protocols comprises the first message protocol; reading, with at least one processor, first payment data from a first payment device, the first payment data associated with a first transaction; generating, with at least one processor, a first message including the first payment data according to the first message protocol; translating, with at least one processor, the first message from the first message protocol to the standard message protocol with the adapter layer to form a first transaction message including the first payment data associated with the first transaction; and communicating, with at least one processor, the first transaction message to a transaction processing system.

Clause 2: The method of clause 1, further comprising: installing, with at least one processor, a second message protocol from the plurality of message protocols on a second transaction terminal based on a second provider of the second transaction terminal, wherein the second message protocol is different from the first message protocol; installing, with at least one processor, the adapter layer on the second transaction terminal, wherein the at least one of the plurality of message protocols comprises the second message protocol; reading, with at least one processor, second payment data from a second payment device, the second payment data associated with a second transaction; generating, with at least one processor, a second message including the second payment data using the second message protocol; translating, with at least one processor, the second message from the second message protocol to the standard message protocol with the adapter layer to form a second transaction message including the second payment data associated with the second transaction; and communicating, with at least one processor, the second transaction message to the transaction processing system.

Clause 3: The method of clause 1 or 2, wherein installing the first message protocol comprises installing at least two of the plurality of message protocols on the first transaction terminal, wherein the at least two message protocols include the first message protocol and a second message protocol, wherein the method further comprises: in response to reading the first payment data from the first payment device, determining, with at least one processor, the first provider of the first transaction terminal; and selecting, with at least one processor, the first message protocol from the at least two message protocols based on the first provider of the first transaction terminal, wherein the first message is generated in response to selecting the first message protocol.

Clause 4: The method of any of clauses 1-3, wherein only one provider-specific message protocol is installed on the first transaction terminal, wherein the one provider-specific message protocol comprises the first message protocol.

Clause 5: The method of any of clauses 1-4, wherein the adapter layer comprises only one mapping from the one provider-specific message protocol to the standard message protocol.

Clause 6: The method of any of clauses 1-5, wherein the first transaction terminal comprises a point-of-sale (POS) device comprising at least one of a chip payment device reader, a magnetic stripe payment device reader, a contactless payment device reader, or any combination thereof.

Clause 7: The method of any of clauses 1-6, wherein the standard message protocol specifies a predetermined message format associated with at least one of the transaction processing system, an issuer system, a gateway system, an acquirer system, or any combination thereof.

Clause 8: The method of any of clauses 1-7, wherein the standard message protocol is specified by an international banking standard.

Clause 9: A system for processing an electronic payment transaction, comprising at least one processor programmed or configured to: install a first message protocol from a plurality of message protocols on a first transaction terminal based on a first provider of the first transaction terminal; install an adapter layer on the first transaction terminal, wherein the adapter layer comprises a mapping from at least one of the plurality of message protocols to a standard message protocol, wherein the at least one of the plurality of message protocols comprises the first message protocol; read first payment data from a first payment device, the first payment data associated with a first transaction; generate a first message including the first payment data according to the first message protocol; translate the first message from the first message protocol to the standard message protocol with the adapter layer to form a first transaction message including the first payment data associated with the first transaction; and communicate the first transaction message to a transaction processing system.

Clause 10: The system of clause 9, wherein the processor is programmed or configured to: install a second message protocol from the plurality of message protocols on a second transaction terminal based on a second provider of the second transaction terminal, wherein the second message protocol is different from the first message protocol; install the adapter layer on the second transaction terminal, wherein the at least one of the plurality of message protocols comprises the second message protocol; read second payment data from a second payment device, the second payment data associated with a second transaction; generate a second message including the second payment data using the second message protocol; translate the second message from the second message protocol to the standard message protocol with the adapter layer to form a second transaction message including the second payment data associated with the second transaction; and communicate the second transaction message to the transaction processing system.

Clause 11: The system of clause 9 or 10, wherein installing the first message protocol comprises installing at least two of the plurality of message protocols on the first transaction terminal, wherein the at least two message protocols include the first message protocol and a second message protocol, wherein the processor is programmed or configured to: in response to reading the first payment data from the first payment device, determine the first provider of the first transaction terminal; and select the first message protocol from the at least two message protocols based on the first provider of the first transaction terminal, wherein the first message is generated in response to selecting the first message protocol.

Clause 12: The system of any of clauses 9-11, wherein only one provider-specific message protocol is installed on the first transaction terminal, wherein the one provider-specific message protocol comprises the first message protocol.

Clause 13: The system of any of clauses 9-12, wherein the adapter layer comprises only one mapping from the one provider-specific message protocol to the standard message protocol.

Clause 14: The system of any of clauses 9-13, wherein the first transaction terminal comprises a point-of-sale (POS) device comprising at least one of a chip payment device reader, a magnetic stripe payment device reader, a contactless payment device reader, or any combination thereof.

Clause 15: The system of any of clauses 9-14, wherein the standard message protocol specifies a predetermined message format associated with at least one of the transaction processing system, an issuer system, a gateway system, an acquirer system, or any combination thereof.

Clause 16: The system of any of clauses 9-15, wherein the standard message protocol is specified by an international banking standard.

Clause 17: A computer program product for processing an electronic payment transaction, the computer program product comprising at least one non-transitory computer-readable medium including one or more instructions that, when executed by at least one processor, cause the at least one processor to: install a first message protocol from a plurality of message protocols on a first transaction terminal based on a first provider of the first transaction terminal; install an adapter layer on the first transaction terminal, wherein the adapter layer comprises a mapping from at least one of the plurality of message protocols to a standard message protocol, wherein the at least one of the plurality of message protocols comprises the first message protocol; read first payment data from a first payment device, the first payment data associated with a first transaction; generate a first message including the first payment data according to the first message protocol; translate the first message from the first message protocol to the standard message protocol with the adapter layer to form a first transaction message including the first payment data associated with the first transaction; and communicate the first transaction message to a transaction processing system.

Clause 18: The computer program product of clause 17, wherein the one or more instructions cause the at least one processor to: install a second message protocol from the plurality of message protocols on a second transaction terminal based on a second provider of the second transaction terminal, wherein the second message protocol is different from the first message protocol; install the adapter layer on the second transaction terminal, wherein the at least one of the plurality of message protocols comprises the second message protocol; read second payment data from a second payment device, the second payment data associated with a second transaction; generate a second message including the second payment data using the second message protocol; translate the second message from the second message protocol to the standard message protocol with the adapter layer to form a second transaction message including the second payment data associated with the second transaction; and communicate the second transaction message to the transaction processing system.

Clause 19: The computer program product of clause 17 or 18, wherein installing the first message protocol comprises installing at least two of the plurality of message protocols on the first transaction terminal, wherein the at least two message protocols include the first message protocol and a second message protocol, wherein the one or more instructions cause the at least one processor to: in response to reading the first payment data from the first payment device, determine the first provider of the first transaction terminal; and select the first message protocol from the at least two message protocols based on the first provider of the first transaction terminal, wherein the first message is generated in response to selecting the first message protocol.

Clause 20: The computer program product of any of clauses 17-19, wherein only one provider-specific message protocol is installed on the first transaction terminal, wherein the one provider-specific message protocol comprises the first message protocol.

Clause 21: The computer program product of any of clauses 17-20, wherein the adapter layer comprises only one mapping from the one provider-specific message protocol to the standard message protocol.

Clause 22: The computer program product of any of clauses 17-21, wherein the first transaction terminal comprises a point-of-sale (POS) device comprising at least one of a chip payment device reader, a magnetic stripe payment device reader, a contactless payment device reader, or any combination thereof.

Clause 23: The computer program product of any of clauses 17-22, wherein the standard message protocol specifies a predetermined message format associated with at least one of the transaction processing system, an issuer system, a gateway system, an acquirer system, or any combination thereof.

Clause 24: The computer program product of any of clauses 17-23, wherein the standard message protocol is specified by an international banking standard.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details of the disclosure are explained in greater detail below with reference to the non-limiting exemplary embodiments that are illustrated in the accompanying schematic figures, in which.

DETAILED DESCRIPTION

Figure 1:
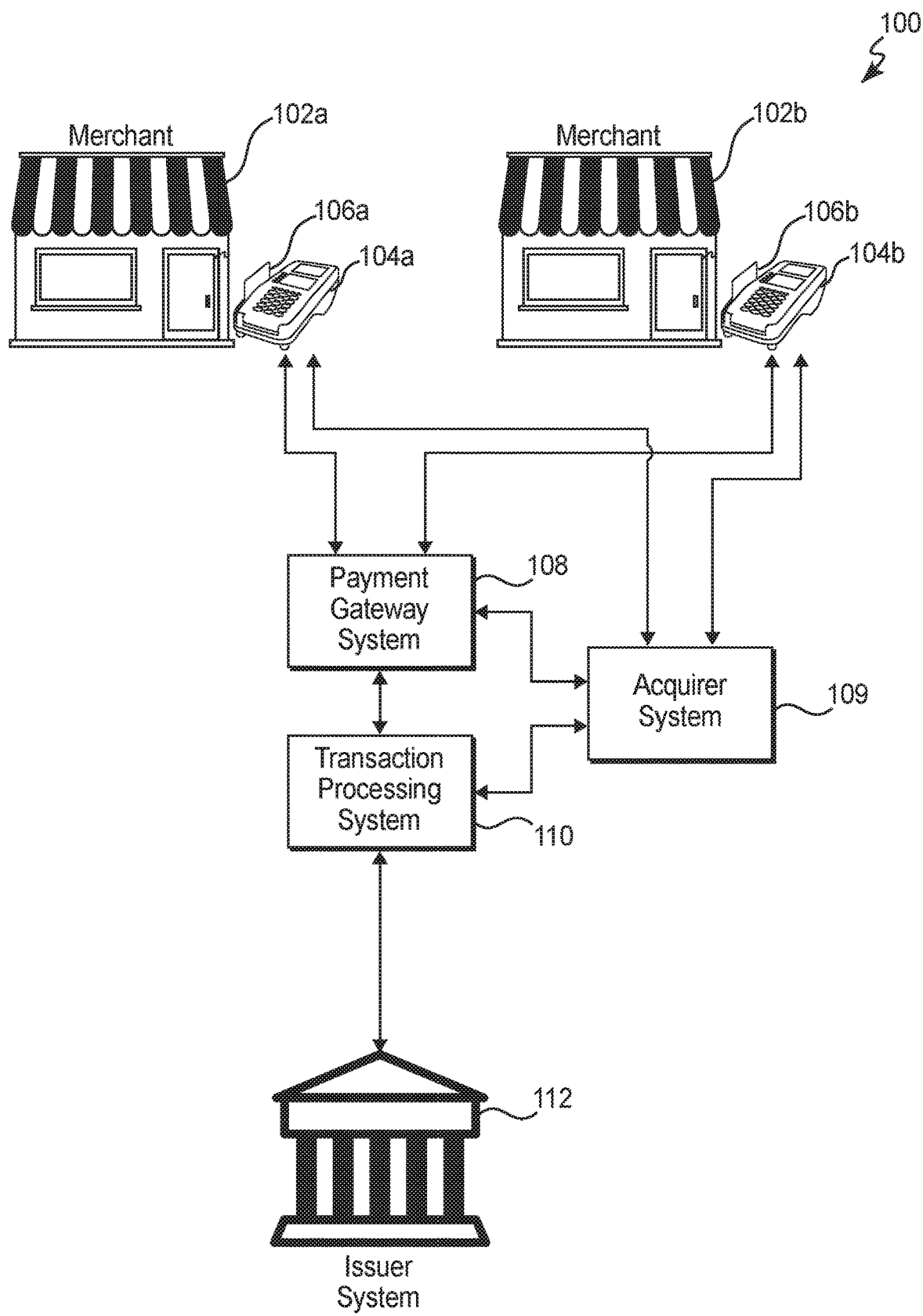
FIG. 1 shows a system for translating messages and processing an electronic payment transaction according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," and/or the like are intended to be open-ended terms. Further, the phrase "based on" is intended to mean "based at least partially on" unless explicitly stated otherwise.

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a payment device (e.g., a portable payment instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computer systems, computer devices, software applications, and/or the like operated by or on behalf of an acquirer institution.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a non-mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "issuer institution" may refer to one or more entities, such as a bank, that provide accounts to users for conducting transactions (e.g., payment transactions), such as initiating credit and/or debit payments. For example, an issuer institution may provide an account identifier, such as a PAN, to a user that uniquely identifies one or more accounts associated with that user. The account identifier may be embodied on a payment device, such as a physical financial instrument, e.g., a payment card, and/or may be electronic and used for electronic payments. The term "issuer system" refers to one or more computer systems, computing devices, software applications, and/or the like operated by or on behalf of an issuer institution, such as a server computer executing one or more software applications. For example, an issuer system may include one or more authorization servers for authorizing a transaction, one or more authentication servers for authenticating a transaction, and/or one or more databases of account data. An issuer system may include a separate or integrated issuer authentication system, such as an Access Control Server (ACS), for authenticating online transactions. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to users (e.g., users) based on a transaction (e.g., a payment transaction). The term "merchant system" may refer to one or more computer systems, computing devices, and/or software applications operated by or on behalf of a merchant, such as a server computer executing one or more software applications.

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." As used herein, the term "server" or "processor" may refer to one or more devices that provide a functionality to one or more devices (e.g., one or more client devices) via a network (e.g., a public network, a private network, the Internet, and/or the like). For example, a server may include one or more computing devices. As used herein, the term "system" may refer to one or more devices, such as one or more processors, servers, client devices, computing devices that include software applications, and/or the like. In some non-limiting embodiments or aspects, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

Non-limiting embodiments or aspects of the present disclosure are directed to a method, system, and computer program product for translating messages. Non-limiting embodiments or aspects provide for a universal transaction terminal capable of communicating a transaction message (e.g., to a payment gateway system, acquirer system, and/or a transaction processing system) that is formatted according to a standard message protocol. The standard message protocol may be according to a format specified by an international banking standard and/or specified by at least one of a transaction processing system, an issuer system, a payment gateway system, an acquirer system, or some combination thereof. Receiving the transaction message according to the standard message protocol enables the payment gateway system and/or the transaction processing system to more efficiently process the electronic payment transaction, regardless of the provider of the transaction terminal. Non-limiting embodiments or aspects include an adapter layer installed on the transaction terminal. The adapter layer translates the message generated by the transaction terminal according to the first message protocol (e.g., provider-specific message protocol) of the transaction terminal to a transaction message according to the standard message protocol compatible with the intended recipient(s) (e.g., payment gateway system, acquirer system, and/or transaction processing system) before any transaction message is communicated thereto. As such, the translation of the relevant payment data into a transaction message according to the standard message protocol occurs at the transaction terminal. Each different type of transaction terminal (e.g., from different transaction terminal providers) may have installed thereon an adapter layer mapping the message protocol used thereby to the standard message protocol so that any type of transaction terminal is capable of generating a transaction message according to the standard message protocol. Therefore, the intended recipient (e.g., payment gateway system, acquirer system, and/or transaction processing system) receives a standardized transaction message regardless of the provider of the transaction terminal to streamline the processing of the electronic payment transaction performed by the electronic payment processing network.

Referring to FIG. 1, a system 100 is shown for translating messages and processing an electronic payment transaction according to some non-limiting embodiments or aspects. The system 100 may include a plurality of different merchants 102a, 102b conducting electronic payment transactions with their customers. Each different merchant 102a, 102b may have transaction terminals 104a, 104b for initiating electronic payment transactions with customers using payment devices 106a, 106b of the customers. The transaction terminals 104a, 104b of the different merchants 102a, 102b may be provided by (e.g., manufactured by and/or the like) different transaction terminal providers. As such, transaction terminal 104a may be provided (e.g., manufactured) by a first provider, and/or transaction terminal 104b may be provided (e.g., manufactured) by a second provider.

In some non-limiting embodiments or aspects, the transaction terminals 104a, 104b may include a point-of-sale (POS) device comprising at least one of a chip payment device reader, a magnetic stripe payment device reader, a contactless payment device reader, or any combination thereof. Additionally or alternatively, the transaction terminals 104a, 104b may include and/or be a part of a POS system. In some non-limiting embodiments or aspects, a chip payment device reader may co-act with a payment device including a payment chip containing account data associated with the payment device for initiating an electronic payment transaction. A magnetic stripe payment device reader may co-act with a payment device including a magnetic stripe containing account data associated with the payment device for initiating an electronic payment transaction. A contactless payment device reader may co-act with a payment device without making physical contact with the payment device to obtain the account data associated with the payment device for initiating an electronic payment transaction. The contactless payment device reader may employ near-field communication (NFC) technology or other suitable technology for contactless communication with the payment device. The transaction terminals 104a, 104b may be configured to co-act with payment devices using any one of and/or any combination of the above, such as a transaction terminal that functions as a chip payment device reader, a magnetic stripe payment device reader, and a contactless payment device reader. The transaction terminals 104a, 104b may communicate with the payment devices to receive account data, such as payment data used to process the electronic payment transaction. The payment data may include data elements specified by ISO 8583 and used for processing the electronic payment transaction or any other data element relevant for processing the electronic payment transaction. Non-limiting examples of payment data include account identifiers (e.g., a PAN), Card Verification Value (CVV) codes, PIN numbers of the payment device, payment device expiration date, cardholder name, and/or the like.

With continued reference to FIG. 1, in some non-limiting embodiments or aspects, the transaction terminals 104a, 104b may have installed a message protocol specified by the provider thereof, and the message protocol may specify a format and/or an arrangement in which account data is stored in a message in response to the transaction terminal 104a, 104b co-acting with the payment device 106a, 106b. For example, transaction terminal 104a may have installed thereon a first message protocol, and transaction terminal 104b may have installed thereon a second message protocol different from the first message protocol. The message generated by the transaction terminals 104a, 104b may include the same and/or different data and may be formatted and/or arranged differently. The message protocol specified by the provider may be installed on the transaction terminals 104a, 104b at the time of manufacturing (e.g., assembly and/or) thereof or installed after manufacturing thereof (e.g., at a time of deployment thereof at a merchant 102a, 102b, at a time of shipping the transaction terminals 104a, 104b for delivery to a merchant 102a, 102b, and/or the like).

In some non-limiting embodiments or aspects, a plurality of message protocols may be installed on the transaction terminals 104a, 104b, such as a plurality of message protocols from a plurality of different providers or a plurality of message protocols from only one provider (e.g., different protocols for different models/versions of the transaction terminals 104a, 104b and/or the like). In response to reading payment data from the payment device 106a, 106b, the transaction terminals 104a, 104b may determine the provider of the transaction terminals 104a, 104b. The transaction terminals 104a, 104b may select the message protocol associated with the determined provider and generate the message using the message protocol associated with the determined provider.

In some non-limiting embodiments or aspects, only one provider-specific message protocol may be installed on the transaction terminals 104a, 104b corresponding to the provider of the transaction terminals 104a, 104b.

With continued reference to FIG. 1, in some non-limiting embodiments or aspects, the transaction terminals 104a, 104b may have installed an adapter layer. The adapter layer may include a mapping from the message protocol of the provider to a standard message protocol. The standard message protocol may be a predetermined message format associated with at least one of a payment gateway system 108, a transaction processing system 110, an issuer system 112, an acquirer system 109, or some combination thereof. At least one of the payment gateway system 108, the transaction processing system 110, the issuer system 112, the acquirer system 109, or some combination thereof may specify the standard message protocol. The standard message protocol may be specified by an international banking standard. The international banking standard may be, as non-limiting examples, a standard set by the International Organization for Standardization (ISO), such as ISO 8583, ISO 20022; EMVCo; 3-D Secure; a central bank of any country; and/or the like. The standard message protocol may be the protocol used by the payment gateway system 108, the acquirer system 109, the transaction processing system 110, and/or the issuer system 112 to process the electronic payment transaction.

With continued reference to FIG. 1, the transaction terminals 104a, 104b, may read account data, including payment data, from the payment devices 106a, 106b in response to an electronic payment transaction being initiated between the consumer having the payment device 106a, 106b and the merchant having the transaction terminals 104a, 104b. The transaction terminals 104a, 104b may generate a message including the payment data based on the message protocol of the provider. The transaction terminals 104a, 104b may translate the message from the message protocol of the provider to the standard message protocol using the adapter layer, in order to form a transaction message including the payment data associated with the transaction. The transaction terminals 104a, 104b may communicate the transaction message consistent with the standard message protocol to the payment gateway system 108, the acquirer system 109, and/or the transaction processing system 110 to initiate processing of the electronic payment transaction. While the message generated by the transaction terminals 104a, 104b may be generated using different message protocols, based on being associated with different providers, the transactions messages communicated therefrom may both be translated into the standard message protocol to make processing of the electronic payment transaction more efficient.

With continued reference to FIG. 1, in some non-limiting embodiments or aspects, the transaction message in the standard message protocol may be and/or include an authorization request. Additionally or alternatively, in response to receiving the transaction message, the payment gateway system 108, the acquirer system 109, and/or the transaction processing system 110 may generate an authorization request including at least a portion of the payment data and communicate the authorization request to the issuer system 112 to cause the issuer system 112 to determine an authorization decision. The authorization request may be generated according to the standard message protocol. The authorization decision may be to approve the electronic payment transaction, approve the electronic payment transaction in part, or to decline the electronic payment transaction. The issuer system 112 may communicate an authorization response to the transaction processing system 110, the acquirer system 109, and/or the payment gateway system 108, and the authorization response may contain the authorization decision. The transaction processing system 110, the acquirer system 109, and/or the payment gateway system 108 may communicate the authorization decision to the transaction terminals 104a, 104b via a transaction response. The authorization response and/or the transaction response may be generated according to the standard message protocol.

Figure 2:
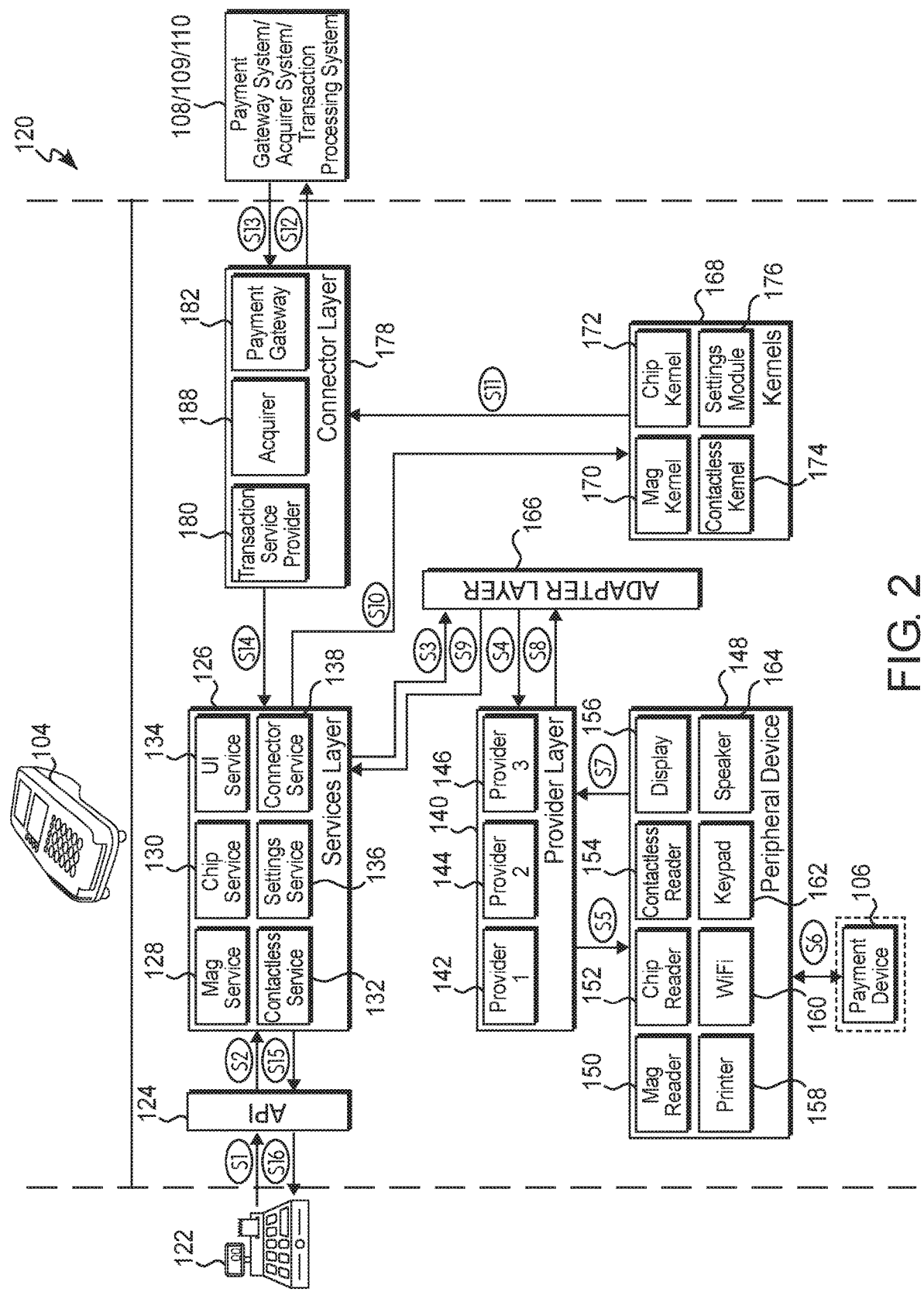
FIG. 2 shows a system for translating messages and processing an electronic payment transaction according to some non-limiting embodiments or aspects.

Referring to FIG. 2, a system 120 is shown for processing an electronic payment transaction according to some non-limiting embodiments or aspects. The system 120 may include a merchant computing device 122 (e.g., a device of and/or part of a POS system, which may be part of a merchant system) in communication with the transaction terminal 104. The transaction terminal 104 may be in communication with at least one of payment gateway system 108, acquirer system 109, the transaction processing system 110, any combination thereof, and/or the like.

In some non-limiting embodiments or aspects, the merchant computing device 122 may include a device (e.g., a POS device and/or a portions thereof) which may be a component of a merchant system operated by or on behalf of the merchant engaging in electronic payment transactions with consumers. In some non-limiting embodiments or aspects, the merchant computing device 122 may include a cash register, an e-commerce merchant website, and/or the like. The merchant computing device 122 may determine a transaction amount associated with the transaction. The merchant computing device 122 may communicate transaction data including the transaction amount and other data used to process the electronic payment transaction to the transaction terminal 104 in an initiation message. In some non-limiting embodiments or aspects, an application program interface (API) 124 of the transaction terminal 104 may receive the initiation message at a step S1. The API 124 may enable the transaction terminal 104 to interact with at least one other device or system (such as the merchant computing device 122), and may enable the other device or system (e.g., merchant computing device 122) to initiate a protocol for initiating an electronic payment transaction, voiding an electronic payment transaction, refunding an electronic payment transaction, and/or the like.

With continued reference to FIG. 2, in some non-limiting embodiments or aspects, at a step S2, in response to receiving the initiation message to initiate an electronic payment transaction, the API 124 may communicate the initiation message to a services layer 126 of the transaction terminal 104.

The services layer 126 may include a plurality of service modules, including a magnetic stripe service module 128, a chip service module 130, a contactless service module 132, a user interface service module 134, a settings service module 136, a connector service module 138, and/or the like. The service modules may include data associated with the various functionalities of the transaction terminal 104. The functionalities may include the payment flow services enabled by the transaction terminal 104 (e.g., the magnetic stripe service module 128, the chip service module 130, the contactless service module 132, and/or the like). The magnetic stripe service module 128 may include data and/or executable instructions associated with processing a transaction initiated by the payment device 106 having a magnetic stripe containing account data co-acting with a magnetic stripe payment device reader as the transaction terminal 104. The chip service module 130 may include data and/or executable instructions associated with processing a transaction initiated by the payment device 106 having a chip containing account data co-acting with a chip payment device reader as the transaction terminal 104. The contactless service module 132 may include data and/or executable instructions associated with processing a transaction initiated by the contactless-enabled payment device 106 containing account data co-acting with a contactless payment device reader (e.g., a NFC reader) as the transaction terminal 104.

The functionality may include other services enabled by the transaction terminal 104 (e.g., user interface service module 134, a settings service module 136, a connector service module 138, and/or the like). The user interface service module 134 may include data and/or executable instructions associated with the user interface displayed on the transaction terminal 104. The settings service module 136 may include data and/or executable instructions associated with various functions available on the of the transaction terminal 104. The connector service module 138 may include data and/or executable instructions associated with the transaction terminal 104 communicating with at least one other device or system, such as the payment gateway system 108 and/or the transaction processing system 110.

With continued reference to FIG. 2, at step S2, the services layer 126 may be engaged to initiate the electronic payment transaction between the transaction terminal 104 and the payment device 106. For example, at least one module (e.g., the magnetic stripe service module 128, the chip service module 130, the contactless service module 132, and/or the like) of the services layer 126 may be engaged (e.g., invoked and/or the like) that corresponds to the payment device type to be used to initiate the electronic payment transaction between the transaction terminal 104 and the payment device 106. For example, the chip service module 130 may be engaged when the transaction terminal 104 includes a chip payment device reader and/or the payment device 106 is a chip payment device, and the chip payment device reader may co-act with the chip payment device to receive account data for processing the electronic payment transaction.

At a step S3, the services layer 126 may communicate with an adapter layer 166. The adapter layer 166 may include a mapping of at least one message protocol of a provider to the standard message protocol (and/or vice-versa). In some non-limiting embodiments or aspects, the adapter layer 166 may include only one provider-specific message protocol mapped to the standard message protocol. Additionally or alternatively, the adapter layer 166 may include a plurality of provider specific message protocols mapped to the standard message protocol, such that the adapter layer 166 includes mappings of provider-specific message protocols of providers not associated with the transaction terminal 104 to the standard message protocol (e.g., a universal adapter layer suitable for a plurality of transaction terminals 104 from a plurality of different providers).

Figure 3:
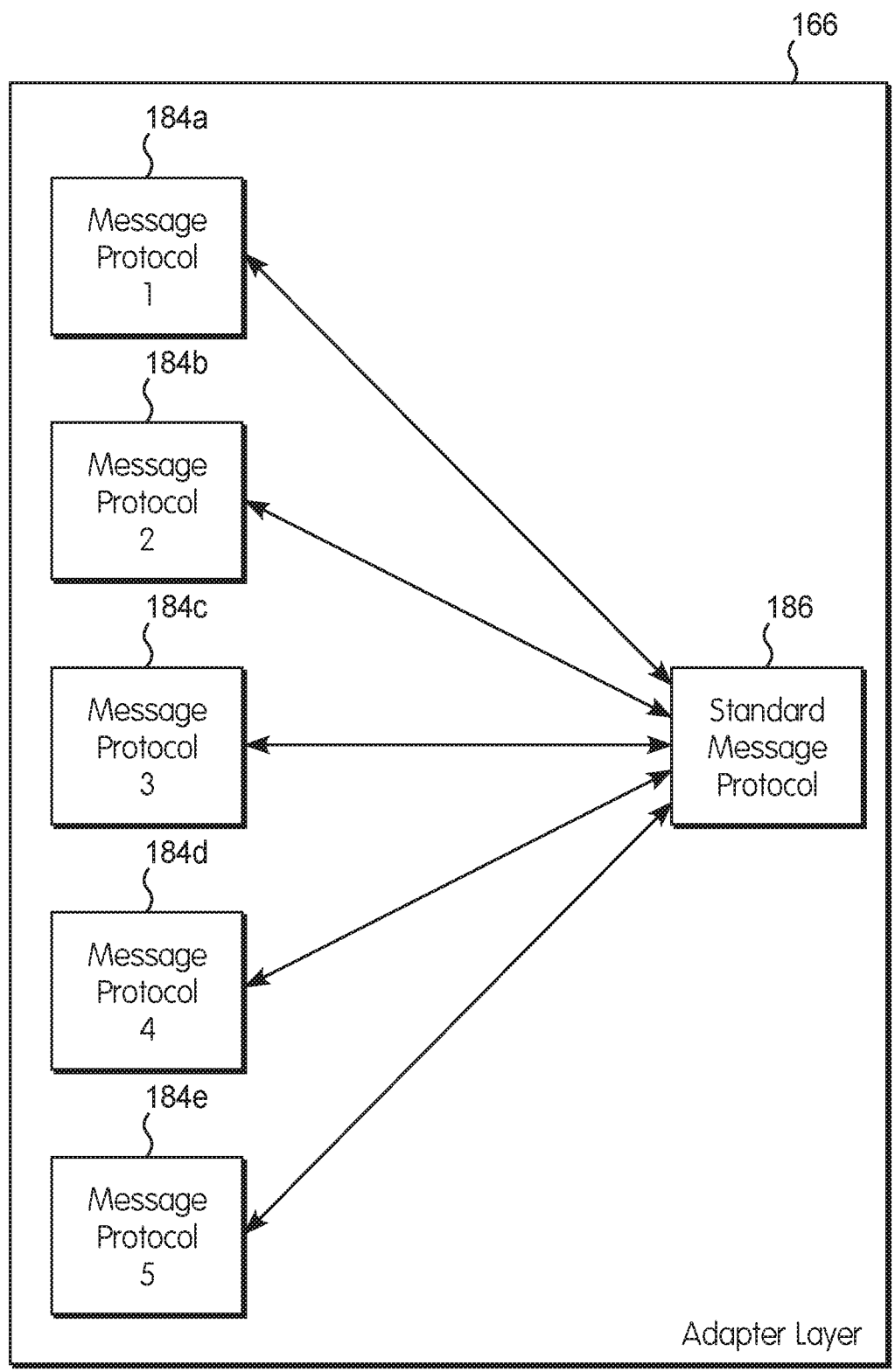
FIG. 3 shows an adapter layer according to some non-limiting embodiments or aspects.

For the purpose of illustration and not limitation, referring to FIG. 3, a non-limiting embodiment or aspect of the adapter layer 166 is shown. As shown in FIG. 3, the adapter layer 166 may include a plurality of message protocols 184a-184e, each of which may be mapped to the standard message protocol 186 such that the message may be translated to a transaction message according to the standard message protocol.

Referring again to FIG. 2, at step S4, the adapter layer 166 may communicate with the provider layer 140 including a kernel 142, 144, 146 associated with the provider of the transaction terminal 104. The provider layer 140 may include a first kernel 142 associated with the provider associated with the transaction terminal 104, and in some non-limiting embodiments or aspects, this first kernel 142 may be the only provider kernel included on the transaction terminal 104 in the provider layer 140. The provider layer 140 may include a second kernel 144 and/or a third kernel 146, etc. associated with other providers not associated with the transaction terminal 104. Each transaction terminal's 104 provider layer 140 may include at least the kernel associated with the provider thereof. The provider kernels 142, 144, 146 may include provider-specific data and/or executable instructions (e.g., software development kits and/or the like) to interact with the transaction terminal 104. For example, such software development kits may include the message protocol(s) associated with the provider.

With continued reference to FIG. 2, at a step S5, the first kernel 142 in the provider layer 140 (e.g., the provider kernel associated with the provider of the transaction terminal 104 engaging in the electronic payment transaction) may communicate with at least one peripheral device 148, which may be a hardware component of the transaction terminal 104. The peripheral device(s) 148 may include at least one of a magnetic stripe payment device reader 150, a chip payment device reader 152, a contactless payment device reader 154, or some combination thereof. The magnetic stripe payment device reader 150 may enable the transaction terminal 104 to co-act with a magnetic stripe payment device. The chip payment device reader 152 may enable the transaction terminal 104 to co-act with a chip payment device. The contactless payment device reader 154 may enable the transaction terminal 104 to co-act with a contactless-enabled payment device. Co-acting with the payment device 106 may include the transaction terminal 104 reading payment data from the payment device 106.

The peripheral device(s) 148 may include a display 156 for displaying data to the user of the transaction terminal 104. The peripheral device(s) 148 may include a printer 158 for printing data from the transaction terminal 104. The peripheral device(s) 148 may be configured for a WiFi connection 160 to communicate over a network with other devices or systems. The peripheral device(s) 148 may include a keypad 162 or other such functionality to enable a user to select or input information to the transaction terminal 104. The peripheral device(s) 148 may include a speaker 164 for emitting audible sound from the transaction terminal 104.

At a step S6, the payment device 106 (e.g., a credit card, a debit card, and/or the like) may co-act with at least one peripheral device 148 (e.g., the magnetic stripe payment device reader 150, the chip payment device reader 152, and/or the contactless payment device reader 154 thereof), which co-action may include receiving (e.g., reading, retrieving, wirelessly receiving, and/or the like) account data (e.g., including account identifier data, payment data, and/or the like) from the payment device 106 by the transaction terminal 104 in order to process the electronic payment transaction.

With continued reference to FIG. 2, at a step S7, the peripheral device 148 may communicate the received account data to the first kernel of the provider layer 140. The first kernel 142 may generate a message using the message protocol associated with the provider of the transaction terminal 104.

At a step S8, the provider layer 140 may communicate the message to an adapter layer 166. The adapter layer 166 may include a mapping of at least one message protocol of a provider to the standard message protocol, as described herein.

With continued reference to FIG. 2, at step S8, the adapter layer 166 may translate the received message from the provider-specific message protocol to the standard message protocol to form a transaction message (e.g., an authorization request and/or the like) including the payment data.

At step S9, the adapter layer 166 may communicate the transaction message to the services layer 126. For example, at least one module (e.g., the magnetic stripe service module 128, the chip service module 130, the contactless service module 132, and/or the like) of the services layer 126 may be engaged (e.g., invoked and/or the like) that corresponds to the payment device type used for the co-action between the transaction terminal 104 (e.g., peripheral device 148 thereof) and the payment device 106, as described herein.

At step S10, the services layer 126 may communicate the transaction message to a kernels layer 168. The kernels layer 168 may include a magnetic stripe kernel 170, a chip kernel 172, and/or a contactless kernel 174 to be invoked depending on the payment device 106 used to initiate the electronic payment transaction (e.g., based on the module of services layer 126 invoked as described herein).

The magnetic stripe kernel 170 may host a set of functions and/or executable instructions for initiating processing of the electronic payment transaction, such as to obtain and process account data from the magnetic stripe of the payment device 106. The magnetic stripe kernel 170 may communicate with the adapter layer 166 and/or the services layer 126 to receive the required payment device-specific details for processing the electronic payment transaction. The magnetic stripe kernel 170 may be invoked when a magnetic stripe of the payment device 106 is used to initiate the electronic payment transaction.

The chip kernel 172 may host a set of functions and/or executable instructions for initiating processing of the electronic payment transaction, such as to obtain and process account data from the chip of the payment device 106. The chip kernel 172 may communicate with the adapter layer 166 and/or the services layer 126 to receive the required payment device-specific details for processing the electronic payment transaction. The chip kernel 172 may be invoked when a chip of the payment device 106 is used to initiate the electronic payment transaction.

The contactless kernel 174 may host a set of functions and/or executable instructions for initiating processing of the electronic payment transaction, such as to obtain and process account data from the contactless-enabled payment device 106. The contactless kernel 174 may communicate with the adapter layer 166 and/or the services layer 126 to receive the required payment device-specific details for processing the electronic payment transaction. The contactless kernel 174 may be invoked when a contactless-enabled payment device 106 is used to initiate the electronic payment transaction.

With continued reference to FIG. 2, in some non-limiting embodiments or aspects, the kernels layer 168 may include a settings module 176. The settings module 176 may host a set of functions and/or executable instructions to set and/or modify settings of the transaction terminal 104. Such settings may include, but are not limited to, types of transaction service providers supported by the transaction terminal 104, types of payment devices accepted by the transaction terminal 104, WiFi settings, Ethernet settings, display settings, keypad settings, and/or the like.

With continued reference to FIG. 2, at a step S11, in response to invoking the relevant kernel from the kernels layer 168, the transaction message may be communicated to a connector layer 178. The connector layer 178 may be used to communicate the transaction message to various devices and/or systems, including at least one of the transaction processing system 110, the issuer system 112 (from FIG. 1), the payment gateway system 108, the acquirer system 109, and/or any combination thereof. The connector layer 178 may include a transaction service provider module 180 including a set of functions and/or executable instructions for communicating the transaction message to the transaction processing system 110. The connector layer 178 may include a payment gateway module 182 including a set of functions and/or executable instructions for communicating the transaction message to the payment gateway system 108. The connector layer 178 may include an acquirer module 188 including a set of functions and/or executable instructions for communicating the transaction message to the acquirer system 109.

At a step S12, the connector layer 178 may communicate the transaction message generated according to the standard message protocol to the payment gateway system 108, acquirer system 109, and/or the transaction processing system 110 to cause the electronic payment processing network to process the transaction, e.g., including authorizing, clearing, and/or settling the electronic payment transaction. The electronic payment processing network may include at least one of the following systems communicating to process the electronic payment transaction: the transaction processing system 110, the issuer system 112 (from FIG. 1), the payment gateway system 108, the acquirer system 109, or any combination thereof.

With continued reference to FIG. 2, according to some non-limiting embodiments or aspects, at a step S13 the connector layer 178 may receive a transaction response from the payment gateway system 108, the acquirer system 109 and/or the transaction processing system 110. The transaction response may include a result of processing of the electronic payment transaction, such as an authorization response associated with an authorization decision of the issuer system 112.

With continued reference to FIG. 2, the connector layer 178 may communicate at least a portion of the transaction response to the merchant computing device 122. In some non-limiting embodiments or aspects, at a step S14, the connector layer 178 may communicate at least a portion of the transaction response to the services layer 126. At a step S15, the services layer 126 may communicate at least a portion of the transaction response to the API 124. At a step S16, the API 124 may communicate at least a portion of the transaction response to the merchant computing device 122. However, other sequences in which at least a portion of the transaction response received by the connector layer 178 is communicated to the merchant computing device 122 may be employed.

Figure 4:
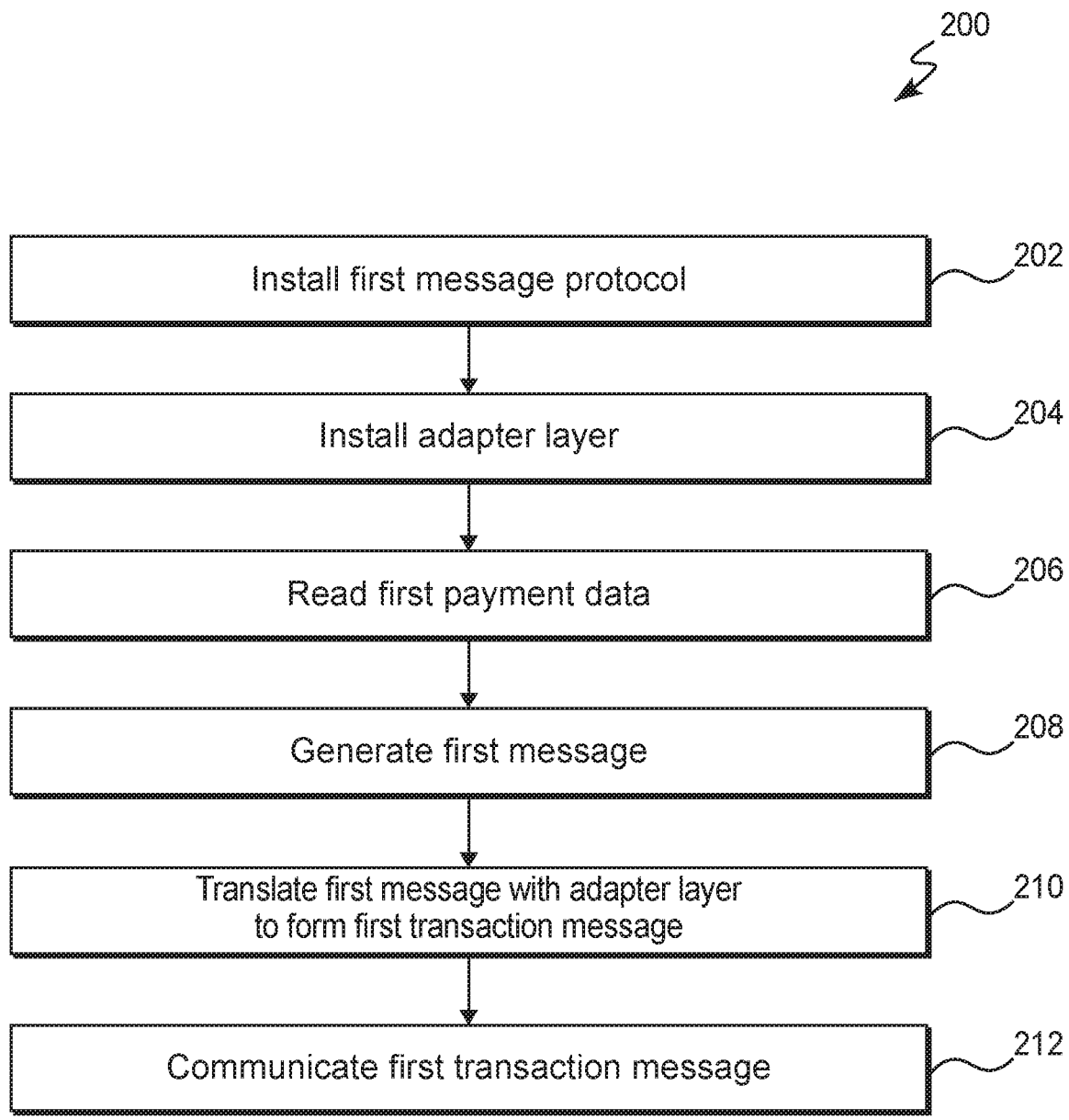
FIG. 4 shows a step diagram of a method for translating messages and processing an electronic payment transaction according to some non-limiting embodiments or aspects.

Referring to FIG. 4, a computer-implemented method 200 is shown for processing an electronic payment transaction according to some non-limiting embodiments or aspects. At a step 202, a first message protocol from a plurality of message protocols may be installed on a transaction terminal based on a first provider of the transaction terminal. At a step 204, an adapter layer may be installed on the transaction terminal. The adapter layer may include a mapping from at least one of the plurality of message protocols to the standard message protocol. The at least one of the plurality of message protocols may include the first message protocol.

At a step 206, the transaction terminal may read first payment data associated with a transaction from a first payment device. At a step 208, the transaction terminal may generate a first message including the first payment data according to the first message protocol.

With continued reference to FIG. 4, at a step 210, the transaction terminal may translate the first message from the first message protocol to the standard message protocol with the adapter layer to form a first transaction message including the first payment data associated with the first transaction. At a step 212, the transaction terminal may communicate the first transaction message to the transaction processing system.

Figure 5:
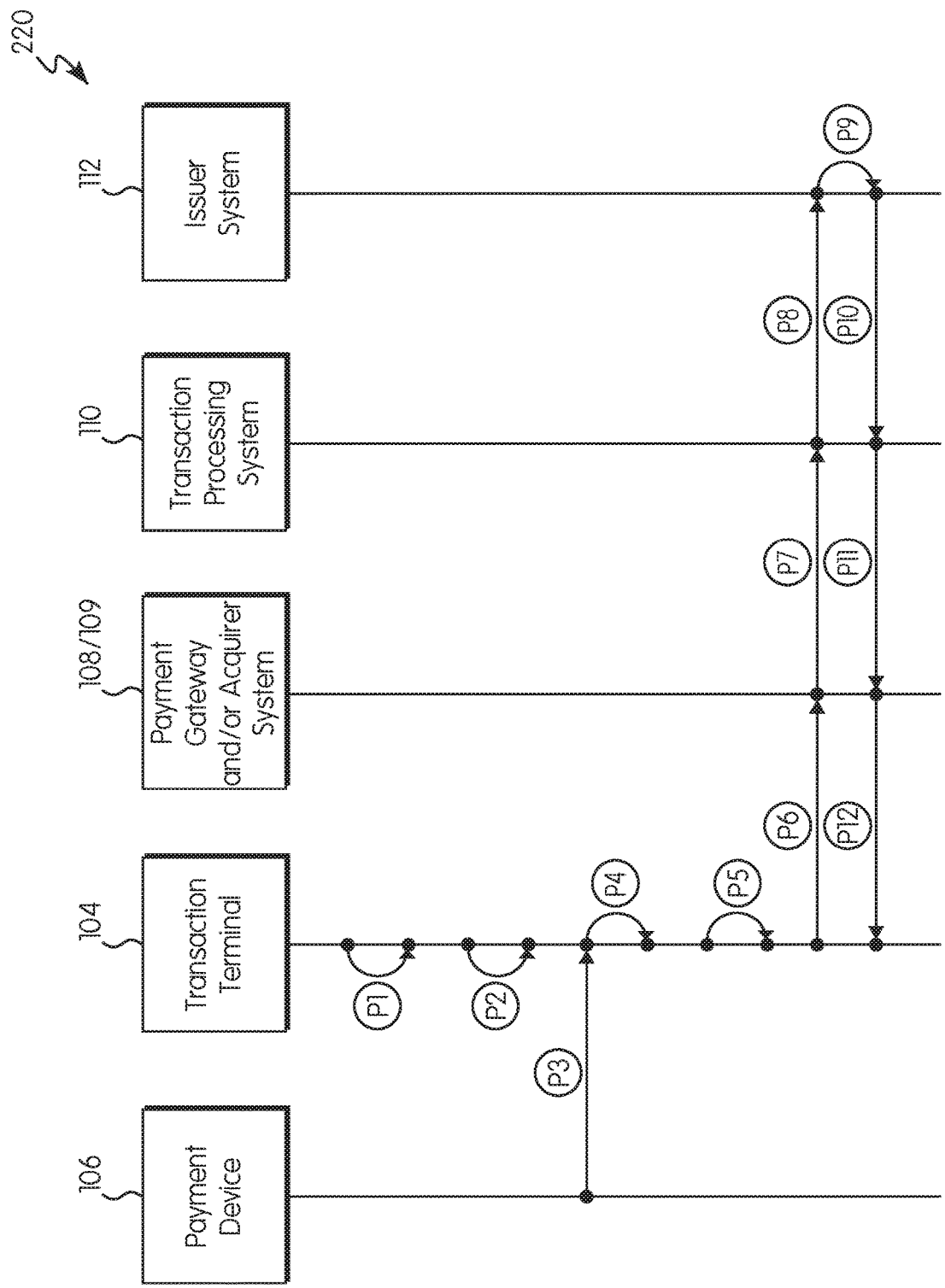
FIG. 5 shows a process flow diagram of a method for translating messages and processing an electronic payment transaction according to some non-limiting embodiments or aspects.

Referring to FIG. 5, a method 220 is shown for processing an electronic payment transaction according to some non-limiting embodiments or aspects. At a step P1, a first message protocol from a plurality of message protocols may be installed on the transaction terminal 104 based on a first provider of the transaction terminal 104. At a step P2, an adapter layer may be installed on the transaction terminal 104, with the adapter layer including a mapping at least from the first message protocol to the standard message protocol.

At a step P3, the transaction terminal 104 may read account data, including the payment data, from the payment device 106 by the payment device 106 co-acting with the transaction terminal 104. In some non-limiting embodiments or aspects, the payment device 106 is a chip payment device, a magnetic stripe payment device, and/or a contactless-enabled payment device engaging with the corresponding chip payment device reader, magnetic stripe payment device reader, and/or contactless payment device reader to communicate the payment data.

With continued reference to FIG. 5, in response to reading the payment data, at a step P4, the transaction terminal 104 may generate a message including the first payment data according to the first message protocol. At a step P5, the transaction terminal 104 may translate the message from the first message protocol to the standard message protocol using the adapter layer to form a transaction message including the payment data.

At a step P6, the transaction terminal 104 may communicate the transaction message to the payment gateway system 108 and/or acquirer system 109 to initiate processing of the electronic payment transaction. In some non-limiting embodiments or aspects, the payment gateway system 108 may communicate the transaction message to the acquirer system 109. At a step P7, the payment gateway system 108 and/or acquirer system 109 may communicate the transaction message to the transaction processing system 110. It will be appreciated that in some non-limiting embodiments or aspects, the transaction processing system 110 and the payment gateway system 108 may be separate systems. In some non-limiting embodiments or aspects, the transaction processing system 110 and the payment gateway system 108 may be implemented (e.g., completely, partially, and/or the like) as one system.

At a step P8, the transaction processing system 110 may generate an authorization request including at least a portion of the transaction message, and the transaction processing system 110 may communicate the authorization request to the issuer system 112. The authorization request may cause the issuer system 112 to determine an authorization decision. At a step P9, the issuer system, in response to receiving the authorization request, may determine an authorization decision for the electronic payment transaction.

With continued reference to FIG. 5, at a step P10, the issuer system 112 may communicate an authorization response including the authorization decision (e.g., an indication thereof) to the transaction processing system 110. At a step P11, the transaction processing system 110 may communicate the authorization response to the payment gateway system 108 and/or acquirer system 109. In some non-limiting embodiments, acquirer system 109 may communicate the authorization response to the payment gateway system 108. At a step P12, the payment gateway system 108 may generate a transaction response including at least a portion of the authorization response. The payment gateway system 108 may communicate the transaction response to the transaction terminal 104.

Figure 6:
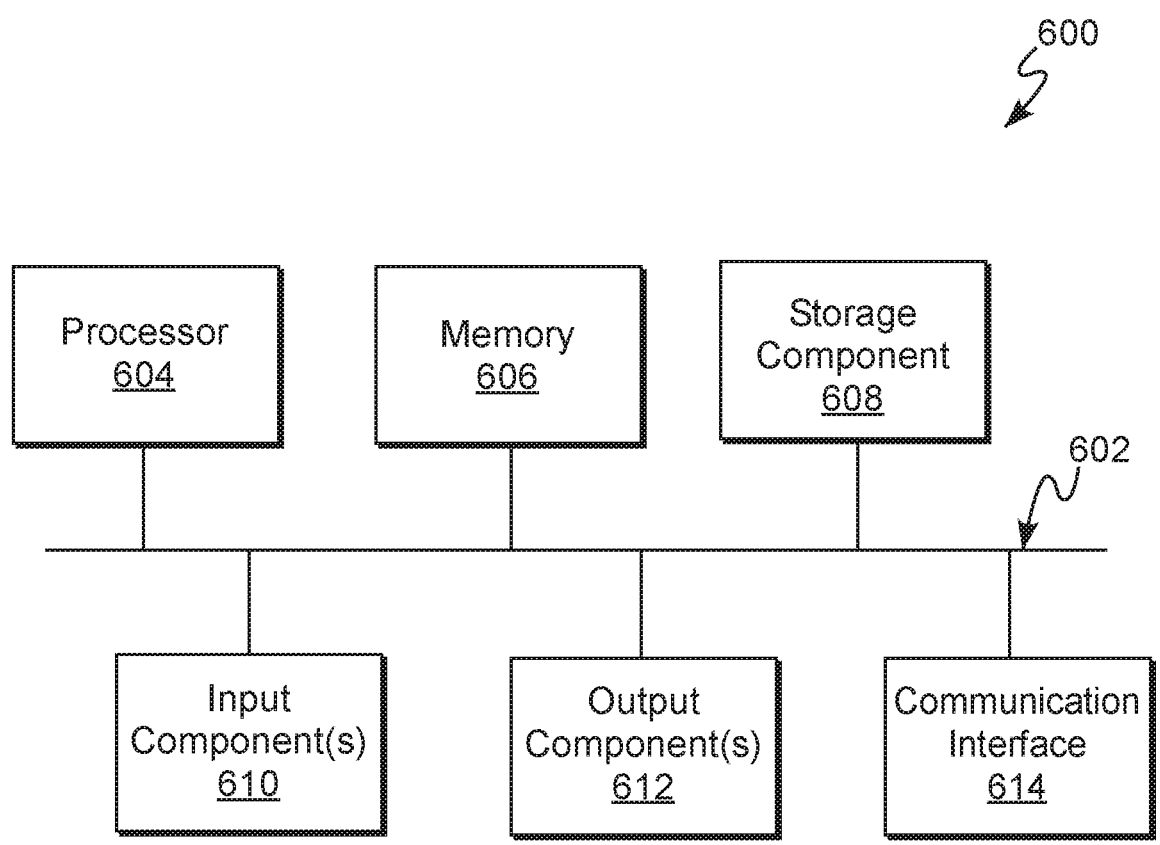
FIG. 6 is a diagram of a non-limiting embodiment of components of one or more devices of FIGS. 1-3 and 5.

Referring now to FIG. 6, FIG. 6 is a diagram of example components of a device 600. Device 600 may correspond to one or more devices shown in any of FIGS. 1-3 and 5. In some non-limiting embodiments, any of the systems shown in FIGS. 1-3 and 5 (e.g., payment gateway system 108, acquirer system 109, transaction processing system 110, issuer system 112, and/or the like) may include at least one device 600 and/or at least one component of device 600. As shown in FIG. 6, device 600 may include bus 602, processor 604, memory 606, storage component 608, input component 610, output component 612, and communication interface 614.

Bus 602 may include a component that permits communication among the components of device 600. In some non-limiting embodiments, processor 604 may be implemented in hardware, software, firmware, and/or any combination thereof. For example, processor 604 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 606 may include random access memory (RAM), read-only memory (ROM), and/or another type of dynamic or static storage device (e.g., flash memory, magnetic memory, optical memory, and/or the like) that stores information and/or instructions for use by processor 604.

Storage component 608 may store information and/or software related to the operation and use of device 600. For example, storage component 608 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 610 may include a component that permits device 600 to receive information, such as via user input (e.g., a touch screen display, a keyboard, a keypad, a mouse, a button, a switch, a microphone, a camera, and/or the like). Additionally or alternatively, input component 610 may include a sensor for sensing information (e.g., a global positioning system (GPS) component, an accelerometer, a gyroscope, an actuator, and/or the like). Output component 612 may include a component that provides output information from device 600 (e.g., a display, a speaker, one or more light-emitting diodes (LEDs), and/or the like).

Communication interface 614 may include a transceiver-like component (e.g., a transceiver, a receiver and transmitter that are separate, and/or the like) that enables device 600 to communicate with other devices, such as via a wired connection, a wireless connection, or a combination of wired and wireless connections. Communication interface 614 may permit device 600 to receive information from another device and/or provide information to another device. For example, communication interface 614 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 600 may perform one or more processes described herein. Device 600 may perform these processes based on processor 604 executing software instructions stored by a computer-readable medium, such as memory 606 and/or storage component 608. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 606 and/or storage component 608 from another computer-readable medium or from another device via communication interface 614. When executed, software instructions stored in memory 606 and/or storage component 608 may cause processor 604 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 6 are provided as an example. In some non-limiting embodiments, device 600 may include additional components, fewer components, different components, or differently arranged components than those shown in FIG. 6. Additionally or alternatively, a set of components (e.g., one or more components) of device 600 may perform one or more functions described as being performed by another set of components of device 600.

In some non-limiting embodiments or aspects, a computer program product for processing an electronic payment transaction includes at least one non-transitory computer readable medium including program instructions that, when executed by at least one processor, cause the at least one processor to execute one of the previously-described methods. The at least one processor may include at least one of the transaction terminal, the transaction processing system, the payment gateway system, the issuer system, the acquirer system, or some combination thereof.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method, comprising:

engaging, with a first transaction terminal, a first payment device type module of the first transaction terminal corresponding to a payment device type associated with a first payment device used to initiate a first transaction, the first payment device type module enabling the reading of first payment data associated with the first transaction from the first payment device, wherein the payment device type comprises at least one of a magnetic stripe payment device, a chip payment device, or a contactless payment device, wherein the first transaction terminal comprises a point-of-sale (POS) device comprising at least one of a chip payment device reader, a magnetic stripe payment device reader, a contactless payment device reader, or any combination thereof;

reading, with the first payment type module of the first transaction terminal, the first payment data from the first payment device by co-action between the first transaction terminal and the first payment device at a merchant point-of-sale;

generating, with the first transaction terminal, a first message by converting the read first payment data according to a first message protocol with a provider layer comprising a provider kernel containing the first message protocol, the first message protocol specifying at least one of a first message format or arrangement of the first payment data;

translating, with the first transaction terminal, the first message from the first message protocol to a standard message protocol with an adapter layer to form a first transaction message including the first payment data associated with the first transaction, the adapter layer comprising a mapping from at least one of a plurality of message protocols to the standard message protocol specified by a transaction processing system, wherein the at least one of the plurality of message protocols comprises the first message protocol, and wherein the standard message protocol specifies at least one of a standard message format or arrangement of the first payment data; and communicating, with the first transaction terminal, the first transaction message to the transaction processing system to cause an electronic payment processing network to process the first transaction.

2. The method of claim 1, further comprising:

engaging, with a second transaction terminal, a second payment device type module of the second transaction terminal corresponding to a payment device type associated with a second payment device used to initiate a second transaction, the second payment device type module enabling the reading of second payment data associated with the second transaction from the second payment device, wherein the payment device type comprises at least one of a magnetic stripe payment device, a chip payment device, or a contactless payment device, wherein the second transaction terminal comprises a point-of-sale (POS) device comprising at least one of a chip payment device reader, a magnetic stripe payment device reader, a contactless payment device reader, or any combination thereof;

reading, with the second payment type module of the second transaction terminal, the second payment data from the second payment device by co-action between the second transaction terminal and the second payment device at a merchant point-of-sale;

generating, with the second transaction terminal, a second message by converting the read second payment data according to a second message protocol with a provider layer comprising a provider kernel containing the second message protocol, the second message protocol specifying at least one of a second message format or arrangement of the second payment data, wherein the second message protocol is different from the first message protocol;

translating, with the second transaction terminal, the second message from the second message protocol to the standard message protocol with an adapter layer to form a second transaction message including the second payment data associated with the second transaction, the adapter layer comprising a mapping from at least one of the plurality of message protocols to the standard message protocol specified by a transaction processing system, wherein the at least one of the plurality of message protocols comprises the second message protocol, and wherein the standard message protocol specifies at least one of a standard message format or arrangement of the second payment data; and communicating, with the second transaction terminal, the second transaction message to the transaction processing system to cause an electronic payment processing network to process the second transaction.

3. The method of claim 1, wherein only one provider-specific message protocol is installed on the first transaction terminal, wherein the one provider-specific message protocol comprises the first message protocol.

4. The method of claim 3, wherein the adapter layer comprises only one mapping from the one provider-specific message protocol to the standard message protocol.

5. The method of claim 1, wherein the standard message protocol specifies a predetermined message format associated with at least one of the transaction processing system, an issuer system, a gateway system, an acquirer system, or any combination thereof.

6. The method of claim 1, wherein the standard message protocol is specified by an international banking standard.

7. A system for processing an electronic payment transaction, comprising a first transaction terminal comprising at least one processor programmed or configured to:

engage a first payment device type module of the first transaction terminal corresponding to a payment device type associated with a first payment device used to initiate a first transaction, the first payment device type module enabling the reading of first payment data associated with the first transaction from the first payment device, wherein the payment device type comprises at least one of a magnetic stripe payment device, a chip payment device, or a contactless payment device, wherein the first transaction terminal comprises a point-of-sale (POS) device comprising at least one of a chip payment device reader, a magnetic stripe payment device reader, a contactless payment device reader, or any combination thereof;

read the first payment data with the first payment type module from the first payment device by co-action between the first transaction terminal and the first payment device at a merchant point-of-sale;

generate a first message by converting the read first payment data according to a first message protocol with a provider layer comprising a provider kernel containing the first message protocol, the first message protocol specifying at least one of a first message format or arrangement of the first payment data;

translate the first message from the first message protocol to a standard message protocol with an adapter layer to form a first transaction message including the first payment data associated with the first transaction, the adapter layer comprising a mapping from at least one of a plurality of message protocols to the standard message protocol specified by a transaction processing system, wherein the at least one of the plurality of message protocols comprises the first message protocol, and wherein the standard message protocol specifies at least one of a standard message format or arrangement of the first payment data; and communicate the first transaction message to the transaction processing system to cause an electronic payment processing network to process the first transaction.

8. The system of claim 7, comprising a second transaction terminal comprising at least one processor programmed or configured to:

engage a second payment device type module of the second transaction terminal corresponding to a payment device type associated with a second payment device used to initiate a second transaction, the second payment device type module enabling the reading of second payment data associated with the second transaction from the second payment device, wherein the payment device type comprises at least one of a magnetic stripe payment device, a chip payment device, or a contactless payment device, wherein the second transaction terminal comprises a point-of-sale (POS) device comprising at least one of a chip payment device reader, a magnetic stripe payment device reader, a contactless payment device reader, or any combination thereof;

read the second payment data with the second payment type module from the second payment device by co-action between the second transaction terminal and the second payment device at a merchant point-of-sale;

generate a second message by converting the read second payment data according to a second message protocol with a provider layer comprising a provider kernel containing the second message protocol, the second message protocol specifying at least one of a second message format or arrangement of the second payment data, wherein the second message protocol is different from the first message protocol;

translate the second message from the second message protocol to the standard message protocol with an adapter layer to form a second transaction message including the second payment data associated with the second transaction, the adapter layer comprising a mapping from at least one of the plurality of message protocols to the standard message protocol specified by a transaction processing system, wherein the at least one of the plurality of message protocols comprises the second message protocol, and wherein the standard message protocol specifies at least one of a standard message format or arrangement of the second payment data; and communicate the second transaction message to the transaction processing system to cause an electronic payment processing network to process the second transaction.

9. The system of claim 7, wherein only one provider-specific message protocol is installed on the first transaction terminal, wherein the one provider-specific message protocol comprises the first message protocol.

10. The system of claim 9, wherein the adapter layer comprises only one mapping from the one provider-specific message protocol to the standard message protocol.

11. The system of claim 7, wherein the standard message protocol specifies a predetermined message format associated with at least one of the transaction processing system, an issuer system, a gateway system, an acquirer system, or any combination thereof.

12. The system of claim 7, wherein the standard message protocol is specified by an international banking standard.

13. A computer program product for processing an electronic payment transaction, the computer program product comprising at least one non-transitory computer-readable medium including one or more instructions that, when executed by at least one processor of a first transaction terminal, cause the at least one processor to:
  engage a first payment device type module of the first transaction terminal corresponding to a payment device type associated with a first payment device used to initiate a first transaction, the first payment device type module enabling the reading of first payment data associated with the first transaction from the first payment device, wherein the payment device type comprises at least one of a magnetic stripe payment device, a chip payment device, or a contactless payment device, wherein the first transaction terminal comprises a point-of-sale (POS) device comprising at least one of a chip payment device reader, a magnetic stripe payment device reader, a contactless payment device reader, or any combination thereof;
  read the first payment data with the first payment type module from the first payment device by co-action between the first transaction terminal and the first payment device at a merchant point-of-sale;
  generate a first message by converting the read first payment data according to a first message protocol with a provider layer comprising a provider kernel containing the first message protocol, the first message protocol specifying at least one of a first message format or arrangement of the first payment data;
  translate the first message from the first message protocol to a standard message protocol with an adapter layer to form a first transaction message including the first payment data associated with the first transaction, the adapter layer comprising a mapping from at least one of a plurality of message protocols to the standard message protocol specified by a transaction processing system, wherein the at least one of the plurality of message protocols comprises the first message protocol, and wherein the standard message protocol specifies at least one of a standard message format or arrangement of the first payment data; and
  communicate the first transaction message to the transaction processing system to cause an electronic payment processing network to process the first transaction.

14. The computer program product of claim 13, wherein the one or more instructions cause at least one processor of a second transaction terminal to:
  engage a second payment device type module of the second transaction terminal corresponding to a payment device type associated with a second payment device used to initiate a second transaction, the second payment device type module enabling the reading of second payment data associated with the second transaction from the second payment device, wherein the payment device type comprises at least one of a magnetic stripe payment device, a chip payment device, or a contactless payment device, wherein the second transaction terminal comprises a point-of-sale (POS) device comprising at least one of a chip payment device reader, a magnetic stripe payment device reader, a contactless payment device reader, or any combination thereof;
  read the second payment data with the second payment type module from the second payment device by co-action between the second transaction terminal and the second payment device at a merchant point-of-sale;
  generate a second message by converting the read second payment data according to a second message protocol with a provider layer comprising a provider kernel containing the second message protocol, the second message protocol specifying at least one of a second message format or arrangement of the second payment data, wherein the second message protocol is different from the first message protocol;
  translate the second message from the second message protocol to the standard message protocol with an adapter layer to form a second transaction message including the second payment data associated with the second transaction, the adapter layer comprising a mapping from at least one of the plurality of message protocols to a standard message protocol specified by a transaction processing system, wherein the at least one of the plurality of message protocols comprises the second message protocol, and wherein the standard message protocol specifies at least one of a standard message format or arrangement of the second payment data; and
  communicate the second transaction message to the transaction processing system to cause an electronic payment processing network to process the second transaction.

15. The computer program product of claim 13, wherein only one provider-specific message protocol is installed on the first transaction terminal, wherein the one provider-specific message protocol comprises the first message protocol.

16. The computer program product of claim 15, wherein the adapter layer comprises only one mapping from the one provider-specific message protocol to the standard message protocol.

17. The computer program product of claim 13, wherein the standard message protocol specifies a predetermined message format associated with at least one of the transaction processing system, an issuer system, a gateway system, an acquirer system, or any combination thereof.

18. The computer program product of claim 13, wherein the standard message protocol is specified by an international banking standard.

* * * * *